United States Patent
Leyvraz et al.

(10) Patent No.: US 6,455,977 B2
(45) Date of Patent: Sep. 24, 2002

(54) ELECTRIC MACHINE

(75) Inventors: René-Louis Leyvraz, Lupfig; Francesco Stallone, Locarno, both of (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/805,995

(22) Filed: Mar. 15, 2001

(30) Foreign Application Priority Data

Mar. 17, 2000 (DE) .......................................... 100 13 375

(51) Int. Cl.⁷ ............................ H02K 1/12; H02K 1/06; H02K 3/38; H02K 3/42
(52) U.S. Cl. ...................... 310/254; 310/216; 310/260; 310/270
(58) Field of Search ................................ 310/254, 256, 310/261, 260, 270, 216, 201, 208, 211

(56) References Cited

U.S. PATENT DOCUMENTS

| | | | | |
|---|---|---|---|---|
| 3,100,271 A | * | 8/1963 | Darrieus et al. ............ | 310/270 |
| 4,088,913 A | * | 5/1978 | Prigorovsky et al. ....... | 310/270 |
| 4,488,077 A | * | 12/1984 | Kovacs ....................... | 310/212 |
| 5,373,211 A | * | 12/1994 | Ramirez-Coronel et al. ..... | 310/260 |
| 6,157,109 A | * | 12/2000 | Schiferi et al. ............. | 310/254 |
| 6,222,296 B1 | * | 4/2001 | Sakai et al. ................. | 310/216 |

OTHER PUBLICATIONS

U.S. Patent No. 4,047,062 to Ludin et al., issued Sep. 6, 1977.
German Patent No. 24 36 319, issued Feb. 12, 1976 (English Abstract Attached).
European Patent No. 0 171 571, issued Feb. 19, 1986 (English Abstract Attached).
Russian Patent No. 1185498, issued Oct. 15, 1985 (English Abstract Attached).
Dr. Carl–Ernst Stephan, et al., "New Air–Cooled Turbogenerator in the 300–MVA Class," ABB Review 1/96. pp. 3–11.

* cited by examiner

*Primary Examiner*—Tran Nguyen
(74) *Attorney, Agent, or Firm*—Burns, Doane, Swecker & Mathis, L.L.P.

(57) ABSTRACT

In a generator with an indirectly gas-cooled, in particular air-cooled, stator winding (21), the end regions of the stator bore (23) are to be designed in such a way that the conductor bars are shielded as effectively as possible by the laminated stator core (20) against magnetic fields inducing eddy currents, but, on the other hand, a specific radial dimension between the rotor retaining ring (12) and the laminated stator core (20) is ensured. According to the invention, for this purpose, the end region of the stator bore is designed with four axial zones having a different diameter profile. A first zone (I) is the interior of the stator with the constant nominal stator bore diameter ($D_I$). Toward the end face of the stator is arranged a second zone (II) with a stator bore diameter ($D_{II}$) widening toward the end face. The stator bore widens, there, to the diameter of a third zone (III) with an at least approximately constant diameter ($D_{III}$), this diameter, on the one hand, being large enough to ensure a necessary distance from the rotor retaining ring, but continuing to ensure a good overlap over the stator conductor bars by the laminated core.

10 Claims, 4 Drawing Sheets

ELECTRIC MACHINE

FIELD OF THE INVENTION

The present invention relates to the technical field of electric machines. It relates, in particular, to the configuration of a stator bore in axial end parts of a stator, in the region of rotor retaining rings.

BACKGROUND OF THE INVENTION

In electric machines, such as generators or electric motors, the air gap dimension between an active part of the rotor and a laminated core of the stator constitutes an important parameter for setting the machine characteristics. On the other hand, this dimension also influences the mechanical handleability of the rotors which often weigh several tons. It is therefore obvious that a minimum radial dimension of the air gap is necessary in order to move the rotor of, for example, a generator for a power output of a few 100 MVA into the stator and out of the stator. The axial end faces of such a machine constitute a critical region in this context.

The rotors are normally provided at their ends with rotor retaining rings. The task of the rotor retaining ring is, inter alia, to fix the axial end regions of rotor windings. The outside diameter of the rotor retaining rings is greater than the outside diameter of the middle part of the rotor, the so-called rotor barrel. Even at these locations, the minimum dimension of the air gap must be ensured, without the air gap dimension inside the stator, consequently in the active region of the machine, being increased. The diameter of the stator bore must therefore be increased in the axial end regions toward the end faces of the stator, in such a way that, for reasons of loss, a minimum necessary radial dimension relative to the rotor retaining ring is ensured in the region of said ring. This minimum dimension must also be maintained in order to make it possible to lift the rotor when it is being drawn along. At the same time, it is highly disadvantageous to increase the inside diameter of the stator bore abruptly in the region in question, since this is located in the still active part of the rotor. Sharp steppings of the bore diameter of the stator laminations in this region would lead to the stator laminations being subjected to axial magnetic fields and to eddy currents resulting from these.

It is known, for example, from SU 1185498 to configure the axial termination of the stator bore in such a way that the magnetic field lines end as exactly as possible. For this purpose, the stator bore is enlarged toward the end face with an increasing gradient, the secondary effect of this being that a sufficient air gap dimension in the region of the rotor retaining ring is also ensured.

It is known, furthermore, from ABB Technik 1/96, page 20 ff, for air-cooled generators to design the stator laminations toward the end face of the stator with a more or less linearly increasing inside bore diameter. This results in a conical widening of the stator bore, which, with a corresponding geometric design of the conicity, makes it possible to maintain the minimum dimension for the air gap. As compared with an abrupt increase in size, the conical widening of the stator bore affords the advantage that only a small region of each stator lamination is subjected to axial magnetic fields, with the result that the load on each individual stator lamination by induced eddy currents remains low. It is specified, moreover, in the case of air-cooled generators, to use a solid aluminum press plate connected operatively to nonmagnetic press fingers, instead of the laminated press plate known from water-cooled generators with a higher unit rating. An advantage is to be seen, here, in that the solid aluminum press plate ensures that the stator laminations are shielded effectively against axial magnetic fields in the end regions of the stator and assists in reducing eddy current losses. A disadvantage of the cited version of the so-called stair-like end stepping of the stator bore is, on the one hand, from a manufacturing point of view, that a large number of stator laminations with different bore diameters are required. Furthermore, with the increasing diameter of the stator bore, the overlap of the conductor bars of the stator is reduced. In turn, however, the conductor bars are not provided for this orientation of the magnetic field lines, and eddy currents which locally cause high thermal load are induced in the conductor bars. Particularly in the case of air-cooled generators and further-increased power output densities, these eddy current losses in the conductor bars may lead to undesirable or even inadmissible local heating and to adverse effects on the efficiencies capable of being achieved.

SUMMARY OF THE INVENTION

The invention is intended to remedy this. The object of the invention, as defined in the claims, is, by means of a novel geometry of the end region of the stator bore, to provide an improvement in the magnetic flux, to reduce eddy currents, and, consequently, lower local heating. The invention is suitable very particularly advantageously for use under the special conditions of the abovementioned air-cooled generators.

According to the invention, in an electric machine of the type initially mentioned, the end region of the stator or the stator bore is designed in axial profile with zones with a different profile of the inside diameter of the stator bore. In this case, a first zone of the stator bore has a constant clear width. For a given rotor, this clear width is predetermined by a radial air gap dimension between the rotor barrel and the laminated stator core. Particularly with regard to the air-cooled generators mentioned, which come within a power output range of up to, for example, 500 MVA, this dimension is of the order of magnitude of a mechanically necessary dimension which must be ensured for the handling of the rotor within the stator bore, for example when the rotor is being moved in and out. At the same time, this minimum dimension must be ensured even in the region of the rotor retaining rings which have a larger diameter than the rotor barrel. According to the prior art, therefore, the stator bore is designed, as mentioned above, with continuous stair-like stepping, along with the problems, likewise mentioned there, of the losses induced by radial magnetic fields in the conductor bars.

Too small a radial distance between the rotor retaining ring and the laminated stator core not only causes problems with mechanical handleability, but also an increase in the slot harmonics induced in the rotor retaining ring.

The invention is intended to specify the configuration of the stator bore end regions in such a way that, on the one hand, a minimization of the eddy current losses in the stator conductor bars is achieved, but, at the same time, it is also advantageous with regard to the further aspects.

According to the invention, a second zone with a bore diameter widening toward the end face of the stator is arranged axially outside the first zone. There follows, in the axial region of the rotor retaining ring, a third zone which, in turn, has a substantially constant bore diameter which, however, is greater than the bore diameter in the first zone. The bore diameter in the third zone is dimensioned such that, at least where conductor material is arranged, the conductor bars of the stator winding are, at least for the most part, overlapped in the circumferential direction by stator teeth. The diameter of the stator bore in the third zone is dimensioned such that at no point in the third zone is it substantially greater than an effective stator winding diameter which is defined by a radially inner boundary of the conductor material of the stator winding. As a result, the conductor bars of the stator winding in the third zone are largely shielded from radial magnetic fields which lead to losses in the stator winding.

In a preferred variant of the invention, the diameter of the stator bore in the third zone is designed in such a way that the radial dimension between the rotor retaining ring and the stator in the third zone does not appreciably exceed the air gap dimension in the first zone of the stator. This, on the one hand, ensures, the maximum overlap of the conductor bars; on the other hand, the mechanical handleability of the rotor is restricted by the minimum radial gap dimension present, and because of this an increase in the radial gap dimension in the third zone above the air gap dimension in the first zone is of no benefit. If, as stated above, the radial air gap dimension in the first zone is already near the minimum value necessary for handling reasons, the diameter of the stator bore in the third zone will preferably have to be dimensioned such that it exceeds the bore diameter in the first zone by the same amount as that by which the diameter of the rotor retaining rings exceeds the diameter of the rotor barrel.

A further design criterion for the diameters of the various zones of the stator bore is a conductor exposure coefficient $Q_D$ which is defined as $$Q_D = \frac{D_{III} - D_I}{D_{\mathit{eff}} - D_I}$$

In this, $D_{III}$ represents the diameter of the stator bore at an axial position of the third zone, $D_I$ the diameter of the stator bore in the axially inner first zone and $D_{\mathit{eff}}$ the above-defined effective stator winding diameter. The conductor exposure coefficient $Q_D$ is therefore to be interpreted as the increase in diameter of the stator bore from the first zone to an axial position of the third zone, in relation to the overlap of the conductor bars in the first zone of the stator. According to the invention, this conductor exposure coefficient is selected higher than 0.5 and lower than 1.1, preferably in the range between 0.9 and 1.05. A selection of the conductor exposure coefficient near 1 is to be preferred, particularly in the case of very confined conditions of space, since this value ensures, on the one hand, a large radial gap and, on the other hand, a good overlap of the conductor bars.

As compared with the prior art having the continuous widening of the diameter of the stator bore, the design according to the invention of the end region of the stator bore affords the further advantage that a smaller number of differently manufactured stator lamination variants is required.

Furthermore, in a preferred embodiment of the invention, a fourth zone with a conical diameter profile widening toward the end face terminates the laminated stator core axially. In further conjunction with an aluminum press plate, this results in an advantageous configuration of the laminated core in terms of magnetic field lines running axially.

BRIEF DESCRIPTION OF THE DRAWINGS

The invention is explained in more detail below with reference to an exemplary embodiment illustrated in the drawing, in which in particular.

DETAILED DESCRIPTION OF THE INVENTION

Figure 1:
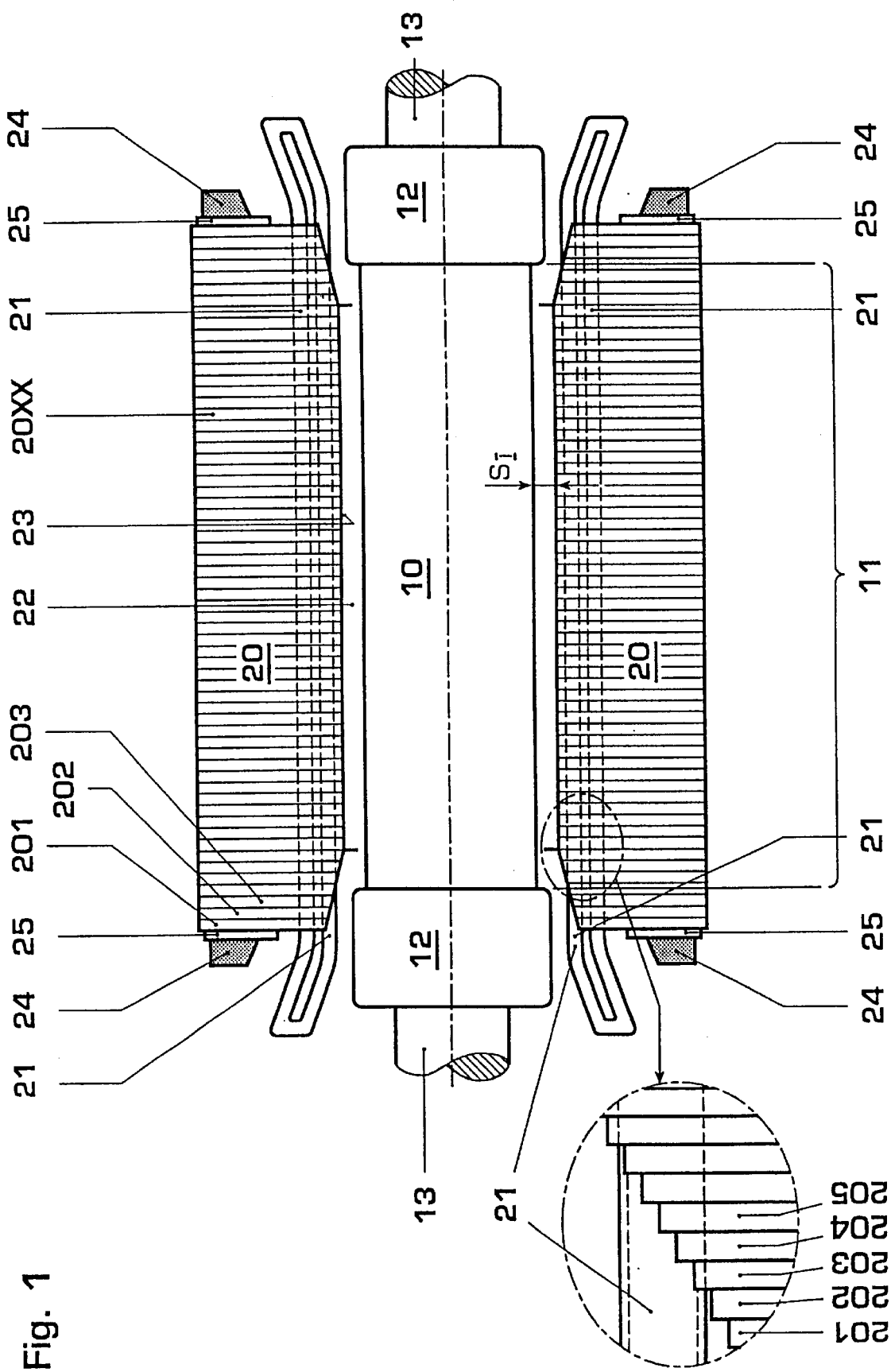
FIG. 1 shows an electric machine with a stator bore, the end regions of which are designed according to the prior art.

The drawing and the following statements are to be understood instructively and are intended to ensure that the idea of the invention is thoroughly understood. By contrast, these exemplary embodiments are not intended to be used to restrict the invention which is defined solely in the claims and which discloses to the person skilled in the relevant art a markedly wider range of embodiments than can be illustrated within this framework.

A prior art is first illustrated in FIG. 1, so that the essential features of the invention and their advantageous effect become open to fully comprehensive assessment. An electric machine, a generator in the example, consists of a rotor 10 and of a stator 20. The stator consists of a number of laminations 201, 202, 203, 204, 205, . . . , 20xx, . . . which are joined to one another in the axial direction and are insulated from one another. As a result, only comparatively low eddy current intensities are generated in the stator. The stator laminations are held together nonpositively, in a way known per se, by means of press plates arranged in end regions of the stator. In this exemplary embodiment, aluminum press plates 24 are arranged on the end face, which are drawn together in the axial direction, for example, by means of ties, not illustrated here, and act on the stator laminations via press fingers 25 consisting of nonferromagnetic material. This form of construction is known for air-cooled generators from ABB Technik 1/96, page 20 ff; further embodiments of the press plates are, of course, familiar to a person skilled in the art. A stator bore 23, into which the rotor 10 is inserted, is located centrally in the stator 20. The rotor forms, with the stator, an air gap 22 having the radial air gap dimension $s_I$. The operating behavior of an electric machine can be influenced by means of the radial air gap dimension. On the other hand, the mechanical handleability of the rotor when it is being installed and removed requires a specific minimum dimension of the radial air gap which must be ensured. Slots, which cannot be seen here, but are familiar to a person skilled in the art, and are also discussed below, and which run in a main axial direction and in which conductor bars 21 of the stator winding are inserted, are introduced in the stator 20. The conductor bars are Roebel bars readily familiar to a person skilled in the art. These conductor bars are overlapped in the tangential direction by stator teeth which, in particular, keep radially running magnetic fields away from the conductor bars; this is likewise not explained in this way, but is familiar to a person skilled in the art. An explicit illustration is therefore dispensed with at this juncture. The geometry of the conductor bars is optimized in terms of magnetic fields running in the circumferential direction. The rotor 10 itself consists of a rotor barrel 11 which constitutes the actual active part of the rotor and which carries the rotor windings. On the end faces, rotor retaining rings 12, the outside diameter of which is greater than that of the rotor barrel, cover the rotor barrel. The task of the rotor retaining rings is, inter alia, to fix the end regions of the rotor winding. The rotor retaining rings are placed axially onto the ends of the rotor barrel. The rotor magnetic field decreases rapidly away from there in the axial direction. The shaft journals 13 of the rotor carry, in a way known per se, bearing points and drive flanges which are not illustrated in the figure. In end regions, the stator bore widens toward the respective end face of the generator. This is necessary in order to maintain the minimum radial dimension of the air gap, even in the region of the rotor retaining rings, without increasing the air gap dimension $s_I$ inside the generator. In the widening of the stator bore, it is necessary to take into account the fact that this necessitates a radial stepping of the stator laminations, this being illustrated in the enlarged detail in the figure. Due to this radial stepping, axial magnetic fields may generate eddy currents in the laminations, specifically the higher, the larger the radial step is. This is, of course, the more critical, the higher the magnetic field intensities are, that is to say the nearer a step is arranged to the inside of the generator. In the embodiments known from practice, a linear stair-like stepping of the stator laminations is selected. The embodiment which is specified in SU 1185498 has a stepping which is progressive toward the end face. As a result, the tangential overlap of the conductor bars 21 by the teeth of the stator laminations is reduced even near the active part and even also in the axial region of the rotor barrel 11, that is to say in the active part of the electric machine. The conductor bars are consequently exposed to high radial magnetic fields for which they are not designed. High eddy currents are thereby induced in the conductor bars in the axial end regions of the stator winding. This can be controlled perfectly well, for example in the case of directly water-cooled windings, since, by virtue of the water cooling, the thermal leakage power occurring is discharged efficiently from the conductor bars. By contrast, in generators utilizing the indirect air cooling of the windings which is very simple per se to implement and is cost-effective, sharp local temperature rises may occur at the relevant points of the conductor bars, while it is scarcely possible per se to implement appropriately an intensification of the cooling.

Figure 2:
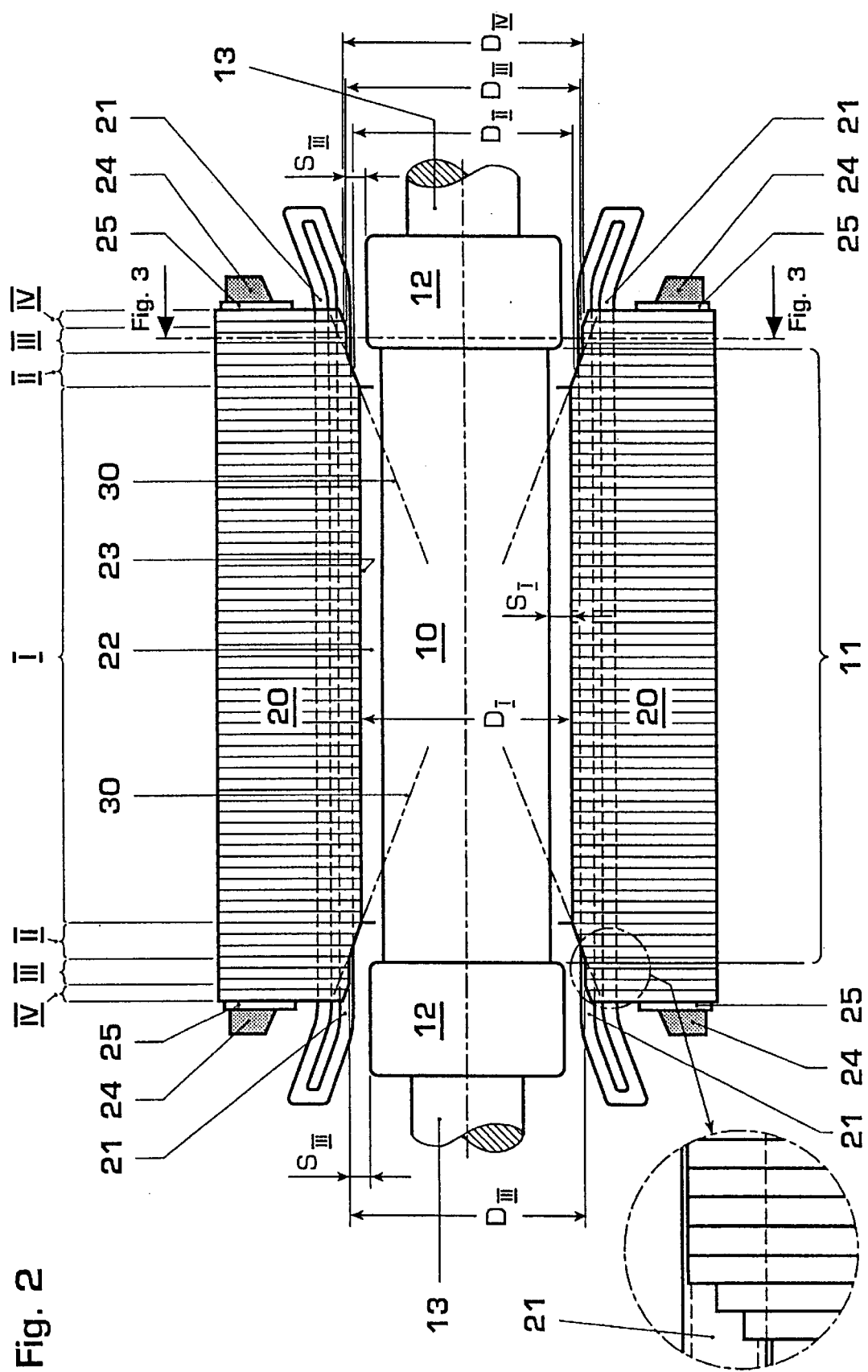
FIG. 2 shows an electric machine, in which the end regions of the stator bore are designed according to the invention.

FIG. 2 shows an electric machine designed according to the invention. The machine is basically constructed in a completely similar way to the machine shown in FIG. 1. The stator 20 similarly consists of stator laminations 20xx which are joined to one another axially and are held together by press plates 24 and press fingers 25. A rotor constructed completely identically to that of FIG. 1 is inserted into a central stator bore 23. Differences are found in the configuration of the stator bore. The stator bore is divided into four zones toward each end face of the stator. An axially inner first zone I has a constant bore diameter $D_I$. This corresponds to the nominal diameter of the stator bore. This is followed by a second zone II with a bore diameter $D_{II}$ increasing axially toward the end face of the generator, in which second zone the diameter of the stator bore increases toward the zone III with the bore diameter $D_{III}$. The opening angle is, in this case, limited primarily by the requirement of limiting the radial steps of the stator laminations, since axially running magnetic fields otherwise induce high eddy currents in the stator laminations. However, the inside diameter profile follows the conventional contour line 30 only until the necessary radial air gap dimension between the stator and a rotor retaining ring 12 is ensured. The bore diameter in the zone III is at least approximately constant, that is to say the stator bore in the zone III is at least approximately cylindrical.

Figure 3:
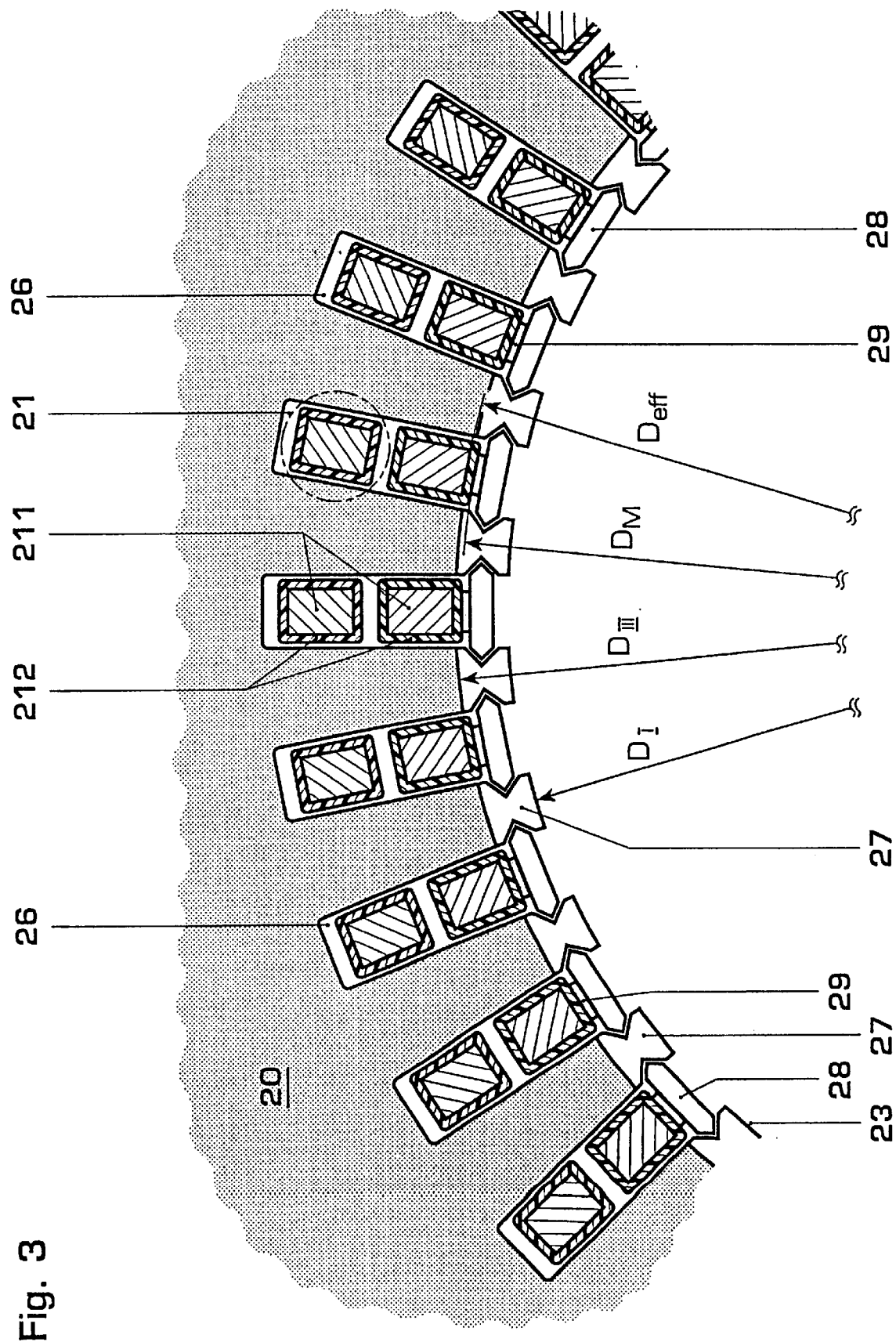
FIG. 3 shows a cross section of the stator of the machine illustrated in FIG. 2.

The criteria for dimensioning the diameter $D_{III}$ which are relevant to the invention are understood better by including FIG. 3 which illustrates a cross section of the stator of the machine from FIG. 2. The abovementioned stator slots 26 which run essentially axially can be seen in this figure. The stator slots 26 are delimited in the circumferential direction by stator teeth 27. The heads of the stator teeth define the stator bore 23 of the stator 20. Arranged in the stator slots 26, between the stator teeth 27, are conductor bars 21 of the stator winding which are designed as Roebel bars readily familiar to a person skilled in the art and which are fixed in the slots by means of slot closing wedges 28 and wedge shims 29. The conductor bars 21 are arranged within the stator slots in such a way that a coolant, for example air, is capable of flowing around them. The conductor bars 21 consist of a conductor material 211, for example copper, which is surrounded by an insulation 212. In this case, a radially inner boundary of the insulation defines a mechanical stator winding diameter $D_M$ and a radially inner boundary of the conductor material defines an effective stator winding diameter $D_{eff}$. The inside diameter $D_I$ of the stator bore in the first zone is smaller than the mechanical stator winding diameter, thus resulting in a complete overlap of the conductor bars by the stator teeth in the circumferential direction. In this case, the diameter of the stator bore in the axially inner zone I is dimensioned such that a radial air gap dimension $s_I$ is established between the laminated stator core and the rotor barrel 11 illustrated only in longitudinal section in FIG. 2, as indicated in FIG. 2. In the third zone III, the radial dimension $s_{III}$ is established between a rotor retaining ring 12 and the laminated core and must be greater than or at least equal to a minimum dimension necessary for reasons of mechanical handleability. This condition is, admittedly, also fulfilled in a version corresponding to the prior art illustrated in FIG. 1; however, according to the prior art, the diameter of the stator bore also follows the general contour line 30 in the third zone. Consequently, the diameter $D_{III}$ of the stator bore in the third zone increases rapidly essentially over the effective winding diameter. Conductor bars are exposed, and, because of radial magnetic fields which are even higher at the boundary of the active region, eddy current losses are generated in the conductor bars. In the present invention, the conductor bars, at least their conductor material, are overlapped completely or at least for the most part by stator teeth in the zone III and are thus shielded effectively from radial magnetic fields acting upon them. The detailed dimensioning of the diameter $D_{III}$ in the design according to the invention of the end regions of a stator bore depends to a great extent on the particular geometry of a generator. A preferred possibility, precisely when conditions of space are confined, for, on the one hand, ensuring the overlap of the conductor bars, but, on the other hand, ensuring the radial distance between the rotor retaining ring and the stator in the zone III, is illustrated in the exemplary embodiment. It can be seen in FIG. 3 that the bore diameter $D_{III}$ in the zone III is selected such that it corresponds essentially to the effective stator winding diameter, and, if anything, is selected somewhat smaller than this. In the machine illustrated here, the bore diameter $D_{III}$ of the third zone is between the effective stator winding diameter $D_{eff}$ and the mechanical stator winding diameter $D_M$. It is, in this case, essential to the invention primarily that, in contrast to the prior art illustrated in FIG. 1, the smallest bore diameter necessary for ensuring mechanical handleability can be selected in the region of the rotor retaining ring in the entire third zone, that is to say, therefore, in the region which surrounds the rotor retaining ring and is directly adjacent to the active part, thus resulting in an overlap of the conductor bars which is increased, as compared with the prior art, and consequently in low eddy current losses.

In the exemplary embodiment in FIG. 2, the zone III is followed axially toward the end face of the stator by a fourth zone IV. In the fourth zone, the diameter $D_{IV}$ of the stator bore increases again toward the end face of the stator. This, in conjunction with the aluminum press plates 24 and the press fingers 25, ensures a favorable termination of the stator with respect to axially running magnetic fields.

Figure 4:
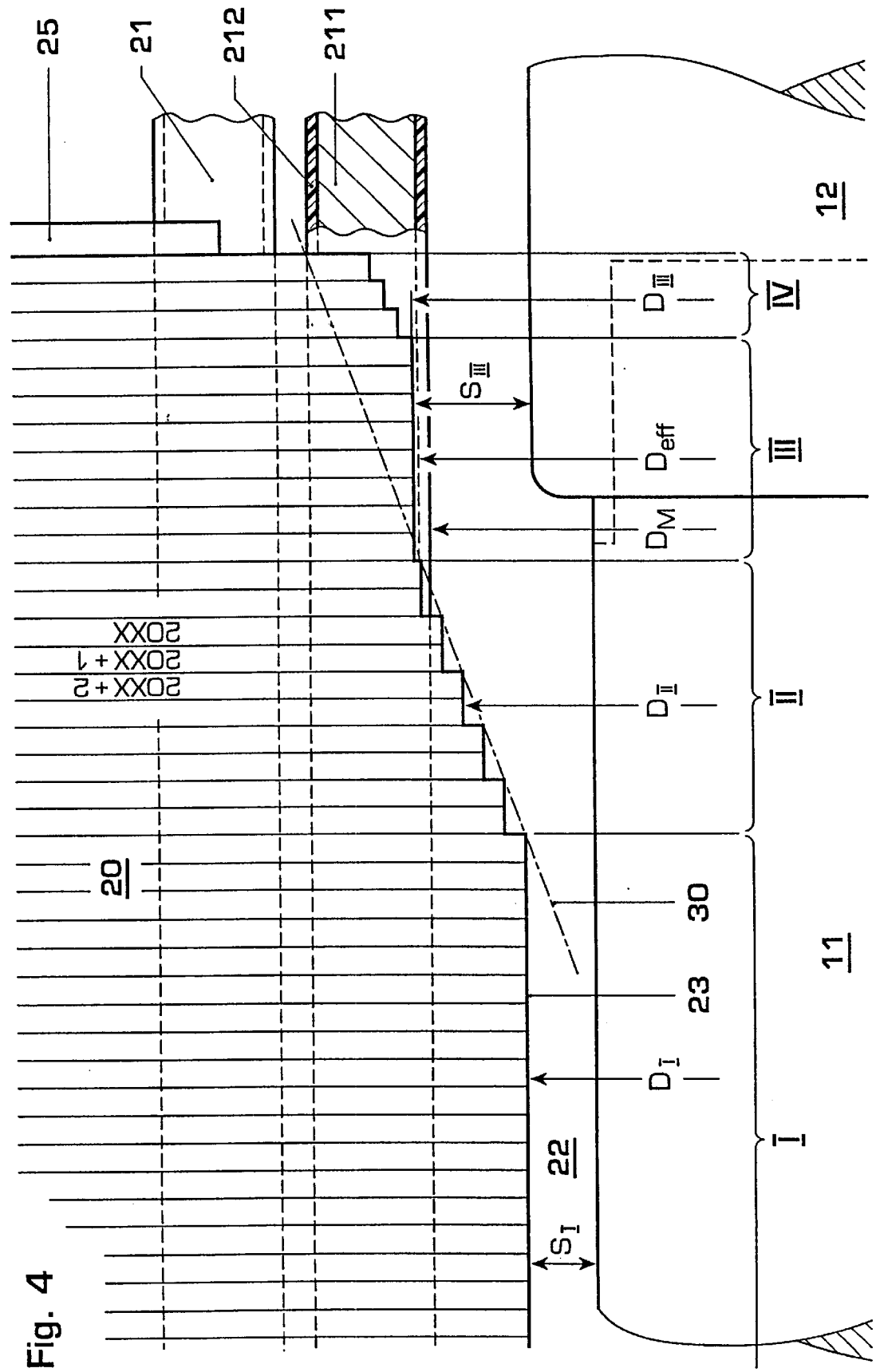
FIG. 4 shows an illustration of a detail of the machine from FIG. 2, in which the essential features of the invention are clearly emphasized.

FIG. 4 illustrates, enlarged, the stator bore end region, designed according to the invention, from FIG. 2. The stator 20 consists of individual stator laminations 20xx joined to one another in the axial direction. Conductor bars 21 of the stator winding are arranged within stator slots which cannot be seen in this view and are not illustrated. In the middle of the electric machine, in the first zone I having the diameter $D_I$, there is a radial dimension $s_I$ between the rotor barrel 11 and the stator 20. In an axial end region, the central stator bore, in which the rotor is installed, must have an increasing diameter, in order to ensure a necessary minimum dimension of the air gap, even in the region of a rotor retaining ring 12, the outside diameter of which is greater than the outside diameter of the rotor barrel 11. In the figure, a contour line 30 is depicted, which follows the contour of the stator bore according to the prior art. As can be seen, in the case of this contour, the conductor bars 21 of the stator winding would be exposed in the region of the ring seat and be open to high radial magnetic fields, with the consequences which were discussed above and which are undesirable per se. According to the invention, the stator bore is divided in an end region into a plurality of zones I, II, III, IV with a different diameter profile. At the same time, in each case, a zone I, III having an at least approximately constant inside diameter $D_I$, $D_{III}$ of the stator bore alternates with a zone II, IV having a bore diameter $D_{II}$ $D_{IV}$ increasing more sharply toward the end face. A first zone I has a constant inside diameter $D_I$. This is followed by a zone II, in which the diameter $D_{II}$ of the stator bore increases. In this region, the bore is conically configured in the example, and its contour follows essentially the general contour line 30. The general conical profile is produced by stator laminations with a larger inside diameter being joined to one another toward the end face. This gives rise to a stair-like contour in detail; a stair-like end stepping of a stator bore of an electric machine is also referred to in this connection. According to the invention, the stair-like stepping of the zone II is not continued in this way as far as the end face of the stator, but only until the bore diameter of the stator bore is large enough, in a region located axially further toward the end face, to ensure a necessary minimum radial dimension of the air gap, even in the region of the rotor retaining ring 12. Consequently, the zone II, which has a conical profile of the stator bore, is followed axially toward the end face by a zone III, in which the diameter $D_{III}$ of the stator bore is essentially constant and in which the stator bore has an at least approximately cylindrical contour. In this zone, according to the invention, the conductor bars of the stator winding are still overlapped completely or at least for the most part by stator teeth, with the result that the conductor bars are effectively shielded from radial magnetic fields. In the example illustrated here, the diameter $D_{III}$ of the stator bore of the zone III is between the mechanical stator winding diameter $D_M$ defined by the insulation 212 of a conductor bar 21 and the effective stator winding diameter defined by the conductor material 211 of the conductor bar. This results, in the exemplary embodiment, in a complete overlap of at least the conductor material 211 of the stator winding 21 by stator teeth, as discussed in connection with FIG. 3. As already described above, eddy currents and undesirable local heatings of the stator winding which result from these are thereby avoided. Finally, the zone III is followed by a zone IV which terminates the stator on the end face and in which the bore diameter increases again. This terminating stair-like stepping avoids individual stator laminations being subjected to high axial magnetic fields. In the zone IV, the overlap of the conductor bars by the stator teeth decreases rapidly. However, the zone IV is short, so that heatings occurring locally can easily be discharged by axial heat conduction. A press finger 25 can be seen axially on the far outside of the stator; the press plate 24 is not illustrated in this figure.

Furthermore, the design according to the invention of the end regions of stator bores of electric machines also affords a series of other advantages. Thus, in the design according to the invention, the number of different variants of stator laminations is markedly smaller than in the case of a design according to the prior art illustrated in FIG. 1. It also proves advantageous, depending on the design of the cooling, that, in the design according to the invention, as illustrated in FIGS. 2 to 4, an aperture for cooling air is formed between the stator and the rotor retaining ring in the region of the zone III.

In light of the above explanations of the invention, together with the exemplary embodiments and with the primary objects of the invention, further advantageous effects and particular embodiments, not illustrated in the example, of the invention defined in the claims will become readily evident to a person skilled in the art.

LIST OF REFERENCE SYMBOLS

10 Rotor
11 Rotor barrel
12 Rotor retaining ring
13 Shaft journal
20 Stator
21 Conductor bar (Roebel bar) of a stator winding
22 Air gap
23 Stator bore
24 Press plate
25 Press finger
26 Stator slot
27 Stator tooth
28 Slot closing wedge
29 Wedge shim
30 General contour line
201 Stator lamination
202 Stator lamination
203 Stator lamination
204 Stator lamination
205 Stator lamination
20xx Stator lamination
211 Conductor material of the stator winding
212 Insulation of the stator winding
I First zone of the stator bore
II Second zone of the stator bore
III Third zone of the stator bore
IV Fourth zone of the stator bore
$s_I$ Radial air gap dimension in the active part of the generator
$s_{II}$ Radial gap dimension between the rotor retaining ring and the stator
$D_I$ Diameter of the stator bore in the middle part of the stator
$D_{III}$ Diameter of the stator bore in the region of the rotor retaining ring
$D_{eff}$ Effective stator winding diameter
$D_M$ Mechanical stator winding diameter
$Q_D$ Conductor exposure coefficient

What is claimed is:

1. An electric machine with a rotor and a stator, the rotor being inserted into a central stator bore of the stator, and essentially axially running stator slots being arranged on an inner cylindrical surface of the stator, said cylindrical surface delimiting the stator bore;

the stator slots being delimited in the circumferential direction by stator teeth;

conductor bars of a stator winding being arranged in these stator slots in the circumferential direction between the stator teeth;

the conductor bars of the stator winding consisting of a conductor material and of an insulation surrounding this conductor material, a radially inner boundary of the insulation defining a mechanical stator winding diameter ($D_M$) and a radially inner boundary of the conductor material defining an effective stator winding diameter ($D_{eff}$);

the rotor containing a rotor barrel, said rotor barrel defining in its axial extent essentially the active part of the generator with magnetic fields which are high during operation;

rotor retaining rings, the outside diameter of which is greater than that of the rotor barrel, being placed onto the rotor barrel at axial ends;

the stator having in the active part a first zone (I) with a constant diameter ($D_I$) of the stator bore, said diameter being greater than the diameter of the rotor barrel by double an air gap dimension ($s_I$);

the diameter ($D_I$) of the stator bore in the first zone (I) being smaller than the effective stator winding diameter ($D_{eff}$), such that the conductor material of the stator winding in the first zone (I) is overlapped at least completely in the circumferential direction by stator teeth;

the stator having in the axial region of the rotor retaining ring a third zone (III) with a profile, at least approximately constant in the axial direction, of the diameter ($D_{III}$) of the stator bore, said diameter ($D_{III}$) being greater by a predetermined minimum amount ($s_{III}$) than the outside diameter of the rotor retaining ring, and said diameter ($D_{III}$) being greater than the diameter ($D_I$) of the stator bore in the first zone (I);

the stator having axially, between the first zone (I) and the third zone (III), a second zone (II) with a stator bore diameter ($D_{II}$) increasing axially toward end faces of the stator;

the diameter ($D_{III}$) of the stator bore in the third zone (III) being at no point appreciably greater than the effective stator winding diameter ($D_{eff}$), such that the conductor material of the stator winding in the third zone (III) is overlapped, at least for a predominant part, in the circumferential direction by stator teeth and a distance ($s_{III}$) mechanically necessary between the stator in the third zone (III) and the rotor retaining ring is ensured.

2. The electric machine as claimed in claim 1, the diameter ($D_{III}$) of the stator bore in the third zone (III) being dimensioned such that the radial distance ($s_{III}$) between the rotor retaining ring and the stator in the third zone at no point appreciably exceeds the radial air gap dimension ($s_I$) in the active part of the generator between the rotor barrel and the first zone (I) of the stator bore.

3. The electric machine as claimed in claim 2, the diameter ($D_{III}$) of the stator bore in the third zone (III) being dimensioned such that the radial distance ($s_{III}$) between the rotor retaining ring and the stator in the third zone corresponds at least approximately to the radial air gap dimension ($s_I$) in the active part of the generator between the rotor barrel and the first zone (I) of the stator bore.

4. The electric machine as claimed in claim 1, the diameter of the stator bore ($D_{III}$) in the third zone (III) being between the mechanical stator winding diameter ($D_M$) and the effective stator winding diameter ($D_{eff}$).

5. The electric machine as claimed in claim 1, a conductor exposure coefficient $Q_D$ being higher than 0.5 and lower than 1.1, said conductor exposure coefficient being defined by $$Q_D = \frac{D_{III} - D_I}{D_{eff} - D_I},$$

in which relation $D_{III}$ represents the diameter of the stator bore at an axial position of the third zone, $D_I$ the diameter of the stator bore in the axially inner first zone and $D_{eff}$ the effective stator winding diameter.

6. The electric machine as claimed in claim 5, the conductor exposure coefficient $Q_D$ being higher than 0.9 and lower than 1.05.

7. The electric machine as claimed in claim 1, wherein the stator winding is an indirectly cooled winding.

8. The electric machine as claimed in claim 7, wherein cooling is carried out by means of air.

9. The electric machine as claimed in claim 1, wherein the electric machine is a generator.

10. The electric machine as claimed in claim 1, there following on the stator, axially outside the third zone (III), a fourth zone (IV) with a stator bore diameter ($D_{IV}$) increasing toward an end face of the stator.

* * * * *